United States Patent
Wimberger-Friedl et al.

(10) Patent No.: US 10,685,210 B2
(45) Date of Patent: Jun. 16, 2020

(54) TISSUE MICROARRAY REGISTRATION AND ANALYSIS

(71) Applicant: KONINKLIJKE PHILIPS N.V., Eindhoven (NL)

(72) Inventors: Reinhold Wimberger-Friedl, Waalre (NL); Anke Pierik, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 178 days.

(21) Appl. No.: 15/753,401

(22) PCT Filed: Aug. 10, 2016

(86) PCT No.: PCT/EP2016/068995
§ 371 (c)(1),
(2) Date: Feb. 19, 2018

(87) PCT Pub. No.: WO2017/032595
PCT Pub. Date: Mar. 2, 2017

(65) Prior Publication Data
US 2018/0247101 A1 Aug. 30, 2018

(30) Foreign Application Priority Data
Aug. 25, 2015 (EP) .................................... 15182257

(51) Int. Cl.
*G06T 7/33* (2017.01)
*G06K 9/00* (2006.01)
(Continued)

(52) U.S. Cl.
CPC ....... *G06K 9/0014* (2013.01); *G06K 9/00147* (2013.01); *G06K 9/00671* (2013.01);
(Continued)

(58) Field of Classification Search
None
See application file for complete search history.

(56) References Cited

U.S. PATENT DOCUMENTS

| 2003/0118222 A1* | 6/2003 | Foran ..................... G06F 19/321 382/128 |
| 2004/0085443 A1* | 5/2004 | Kallioniemi ............ G01N 1/36 348/135 |

(Continued)

FOREIGN PATENT DOCUMENTS

WO 2015063192 A1 5/2015

OTHER PUBLICATIONS

Chen, Wenjin et al "Unsupervised Imaging, Registration and Archiving of Tissue Microarrays", Proceedings of the Symposium of the American Medical Informatics Association, 2002, pp. 136-139.

(Continued)

*Primary Examiner* — Idowu O Osifade
(74) *Attorney, Agent, or Firm* — Sherry Austin (57) ABSTRACT

The present invention relates to digital pathology. In order to facilitate analyzing a tissue microarray, an apparatus is provided for tissue examination. The apparatus comprises a data input (102), a tissue microarray analyzing unit (104), and an output (106). The data input is configured to receive a reference image of a reference slice obtained from a tissue sample block; and to receive a microarray image of a microarray slice comprising at least one tissue core obtained from at least the tissue sample block. The tissue microarray analyzing unit is configured to register tissue core images of at least one tissue core with the reference image based on a spatial arrangement of the respective tissue core within the tissue sample block. The output is configured to provide a registered result obtained from the tissue microarray analyzing unit for further analyzing purposes.

14 Claims, 7 Drawing Sheets

(51) Int. Cl.
*G06K 9/20* (2006.01)
*G06T 7/00* (2017.01)
*G06F 3/147* (2006.01)

(52) U.S. Cl.
CPC .......... *G06K 9/2063* (2013.01); *G06T 7/0014* (2013.01); *G06T 7/337* (2017.01); *G06F 3/147* (2013.01); *G06K 2209/05* (2013.01); *G06K 2209/07* (2013.01); *G06T 2207/10056* (2013.01); *G06T 2207/20212* (2013.01); *G06T 2207/30024* (2013.01); *G06T 2207/30072* (2013.01)

(56) References Cited

U.S. PATENT DOCUMENTS

| | | |
|---|---|---|
| 2009/0245610 A1 | 10/2009 | Can |
| 2009/0247416 A1 | 10/2009 | Can |
| 2013/0084012 A1 | 4/2013 | Murphy |
| 2013/0210648 A1 | 8/2013 | Hewitt |
| 2013/0338016 A1 | 12/2013 | McDonough |
| 2014/0100188 A1 | 4/2014 | Brennan |

OTHER PUBLICATIONS

Bello, Musodig et al "Accurate Registration and Failure Detection in Tissue Micro Array Images", Biomedical Imaging: From Nano to Macro, 2008, pp. 368-371.

Fiala, John C. et al "Extending Unbiased Stereology of Brain Ultrastructure to Three-Dimensional Volumes", Journal of the American Medical Informatics Association, vol. 8, No. 2, Jan. 2001.

Samset, E. et al "Augmented Reality in Surgical Procedures", Proceedings of SPIE, vol. 6806, Feb. 2008.

Kalkofen, Denis et al "Visualization Techniques for Augmented Reality", Handbook of Augmented Reality, Jan. 2011, pp. 65-97.

Wang, Fusheng et al "A Data Model and Database for High-Resolution Pathology Analytical Image Informatics", Journal Pathology Informatics, 2011.

Morris, L. et al, "A Metadata-Aware Application for Remote Scoring and Exchange of Tissue Microarray Images", BMC Bioinformatics, vol. 14, No. 147, 2013.

Manley, Sargum et al "Relational Database Structure to Manage High-Density Tissue Microarray Data and Images for Pathology Studies Focusing on Clinical Outcome, The Prostate Specialized Program of Research Excellence Model", AJP, Sep. 2001, vol. 159, No. 3, pp. 837-843.

* cited by examiner

TISSUE MICROARRAY REGISTRATION AND ANALYSIS

CROSS-REFERENCE TO PRIOR APPLICATIONS

This application is the U.S. National Phase application under 35 U.S.C. § 371 of International Application No. PCT/EP2016/068995, filed on Aug. 10, 2016, which claims the benefit of European Patent Application No. 15182257.4, filed on Aug. 25, 2015. These applications are hereby incorporated by reference herein.

FIELD OF THE INVENTION

The present invention relates to the field of digital pathology, and in particular to an apparatus, to a system, and to a method for tissue examination. Furthermore, the invention relates to a computer program element as well as to a computer-readable medium.

BACKGROUND OF THE INVENTION

Pathology diagnostic investigation of patient material (e.g. tissue and cells) is the basis of many treatment decisions, e.g. in oncology. In standard anatomical pathology, diagnosis is made on the basis of cell morphology and staining characteristics. The investigation of the pathogenesis and progression of diseases, such as cancer, may require the use of multiple biomarkers for staining. The validation of these biomarkers using the standard histopathological techniques may be time-consuming and labor intensive.

In recent years, tissue microarray has been proposed to overcome these problems. Tissue microarrays are paraffin blocks produced by extracting tissue cores from different paraffin donor blocks and re-embedding these into a single recipient (or microarray) block as an array. Therefore, a tissue microarray may allow high throughput analysis of multiple specimens at the same time. For example, US 2009/0247416 A1 describes a method for analysis of tissue microarrays. However, analyzing images of tissue microarrays may be difficult e.g. with multiple tissue cores and/or multiple stains. WO2015063192 relates to a method of registration of two images of whole tissue slices. An unreliable area in the first image is determined and the registration is performed based on an area in the first image outside the unreliable area.

SUMMARY OF THE INVENTION

There may be a need to facilitate analyzing a tissue microarray.

The object of the present invention is solved by the subject-matter of the independent claims, wherein further embodiments are incorporated in the dependent claims. It should be noted that the following described aspects of the invention apply also for the apparatus, for the system, and for the method for tissue examination, as well as for the computer program element and for the computer-readable medium.

According to a first aspect of the present invention, an apparatus is provided for tissue examination. The apparatus comprises a data input, a tissue microarray analyzing unit, and an output. The data input is configured to receive a reference image of a reference slice obtained from a tissue sample block; to receive a microarray image of a microarray slice comprising at least one tissue core obtained from at least the tissue sample block; and to provide the reference image and the microarray image to the tissue microarray analyzing unit. The tissue microarray analyzing unit is configured to register tissue core images of at least one tissue core with the reference image based on a spatial arrangement of the respective tissue core within the tissue sample block. The output is configured to provide a registration result obtained from the tissue microarray analyzing unit for further analyzing purposes.

As a result, the tissue core images are arranged at the corresponding positions in the reference image (e.g. whole slide image) of the tissue. This allows an operator, e.g. a pathologist, to interpret the staining results on the tissue cores in the context of the whole slide image of the tissue of origin.

According to an example of the present invention, the tissue microarray analyzing unit is further configured to identify a feature of interest within the registered tissue core images based on morphological information of the registered tissue core image. Additionally, the tissue microarray analyzing unit is configured to recognize a matching feature in a periphery area on the reference image based on the morphological information, wherein the periphery area surrounds the respective registered tissue core image. Furthermore, the tissue microarray analyzing unit is configured to extend a staining pattern of the feature of interest within the registered tissue core images into the matching feature in the periphery area such that the staining pattern continues through and beyond a perimeter of the respective registered tissue core image.

As a result, the extension, or extrapolation, of the staining results into areas outside the tissue core or tissue cores creates digital staining around the tissue cores, which may facilitate manual scoring and interpretation.

According to a second aspect of the present invention, a system is provided for tissue examination. The system comprises an image providing apparatus and an apparatus for tissue examination according to one of the examples described above and in the following. The image providing apparatus is configured to provide a reference image of a reference slice obtained from a tissue sample block. The image providing apparatus is further configured to provide a microarray image of a microarray slice comprising at least one tissue core obtained from at least the tissue sample block. In addition, the image providing apparatus is configured to provide the reference image and the microarray image to the apparatus for tissue examination.

As a result, the system allows a combination of the morphological information in the tissue core images and in the reference image, e.g. whole slide image, of the tissue of origin, thus making it easier to understand the context of the tissue core image in the whole sample, e.g. in the total tumor.

According to an example of the present invention, the system further comprises a display. The display is configured to display the registered tissue core images in combination with the reference image for analyzing purpose.

As a result, the registration results are visually presented to an operator, e.g. a pathologist, for better interpretation of staining results.

According to a third aspect of the present invention, a method is provided for tissue examination. The method comprises the following steps:

a) providing a reference image of a reference slice obtained from a tissue sample block;

b) providing a microarray image of a microarray slice comprising at least one tissue core obtained from at least the tissue sample block;

c) registering tissue core images of at least one tissue core with the reference image based on a spatial arrangement of the respective tissue core within the tissue sample block; and d) providing the registered tissue core images in combination with the reference image for analyzing purposes.

As a result, this may facilitate understanding the context of the tissue cores in the total tissue.

The combination may be realized in several methods. For example, the registered tissue core images are combined with the reference image in an overlaid manner. In a further example, the registered tissue core images are inserted into the reference image.

According to an example of the present invention, for step a) it is provided:

a1) generating the reference slice from the tissue sample block; and a2) generating an image from the reference slice as the reference image.

In step a1), the reference slice may be stained e.g. with hematoxylin and eosin (H&E) dyes, before generating an image to enhance contrast and make certain morphological features visible. For example, the reference image is a whole slide image of the tissue to be examined.

According to an example of the present invention, for step b) it is provided:

b1) creating a microarray block comprising at least one tissue core arranged within a block structure;

b2) generating at least one microarray slice of the microarray block; and b3) generating an image of the microarray slice as the tissue microarray image.

According to an example of the present invention, in step b2) the at least one microarray slice is stained. Optionally, the at least one microarray slice is stained differently than the reference slice.

In other words, the at least one microarray slice may be stained with at least one staining protocol for visualizing morphological information of certain features of interest. Also biomarkers, such as proteins or nucleic acids, may be staining targets.

According to an example of the present invention, the method further comprises:

f) identifying a feature of interest within the registered tissue core images based on morphological information of the registered tissue core image;

g) recognizing a matching feature in a periphery area on the reference image based on the morphological information, wherein the periphery area surrounds the respective registered tissue core image; and h) extending a staining pattern of the feature of interest within the registered tissue core images into the matching feature in the periphery area such that the staining pattern continues through and beyond a perimeter of the respective registered tissue core image.

By extending the staining pattern into the periphery area around the tissue core images, the matching features outside the tissue cores are also colorized or marked. This may allow a user, e.g. pathologist, to identify features of interest not only inside but also outside the tissue core images. In other words, the extension of the staining pattern may enlarge the staining results, thus facilitating e.g. manual scoring and interpretation of certain features.

According to an example of the present invention, step g) further comprises:

g1) assigning a quality index to the matching feature in the periphery area; and g2) determining a range of the periphery area based on the assigned quality index.

In other words, the range of extension (or extrapolation) is determined by the quality index that may relate to the reliability of the feature matching. This allows a user to control the extent of feature matching process outside the tissue core images.

According to an example of the present invention, the staining pattern that extends into the matching feature has a transparency and/or intensity in dependence of:

the assigned quality index; and/or a distance from the registered tissue core image.

In an example, the intensity can be varied gradually with increasing distance from the tissue cores. The reduction of intensity may also depend on the quality index related to the reliability of feature extension. As a result, a user (e.g. a pathologist) may identify the reliability of the feature extension (or feature matching) according to the respective intensity and/or transparency of matching features.

According to an example of the present invention, at least two tissue cores are stained with different staining protocols. In step c), tissue core images of the at least two tissue cores are registered with the reference image.

As a result, multiple stains can be visualized and analyzed on the same reference image (e.g. whole slide image) simultaneously at different positions. This may facilitate e.g. sub-typing tumors for oncology diagnostics. Taking multiple cores at different positions may also be helpful e.g. for understanding the heterogeneous aspect of the tumors.

According to an example of the present invention, the method further comprises:

b4) providing a further microarray image of a further microarray slice obtained from the microarray block, wherein the further microarray slice is stained differently from the microarray slice; and c1) registering further tissue core images of at least one of the tissue cores of the further microarray image with the reference image.

The microarray slice is also referred to as first microarray slice, whilst the further microarray slice is also referred to as second microarray slice.

In other words, consecutive slides may receive different staining, and/or staining for different biomarkers. As a result, it is possible to stain the same tissue core with different staining protocol for better understanding pathological information.

According to an example of the present invention, in step c1), the further tissue core images are registered based on at least one of the previously registered tissue core images.

Since certain information, such as the orientation of an individual tissue core with respect to the direction of the tissue microarray, remains unchanged (or nearly unchanged) for all slices from the same microarray block, such information may be used for improving the matching process.

According to a fourth aspect of the invention, a computer program element is provided for controlling an apparatus according to one of the embodiments described above and in the following, which, when being executed by a processing unit, is adapted to perform the inventive method.

According to a fifth aspect of the invention, a computer readable medium is provided having stored the program element.

The term "reference image" may also be referred to as "whole slide image", digital image or digital slide. A reference image relates to image data created from (e.g. glass) slides using a scanning device. Reference images (whole slide images, digital images or digital slides) may be directly provided by a scanning device, like a desktop slide scanner. Alternatively, reference images may be provided by an image management system that allows for archival and intelligent retrieval either locally or remotely via the Internet.

The term "tissue sample block", also referred to as donor block, relates to tissue, obtained from a region of a human or non-human. The tissue sample block may be obtained from a living organism, or also from a non-living (dead) organism, which may be embedded in paraffin for later use. For example, depending on a suspected cancer type, tissue sample block may be obtained in different ways such as punch/core biopsy, excisional/incisional biopsy, resection, etc.

The term "sample slice" or "slice" relates to a thin slice of the pathological sample block, which is obtained by sectioning the paraffin-embedded pathological sample block (after e.g. chemical fixation, processing and embedding procedures) into thin slices (thickness may relate to an order of a few micrometers).

The term "sample slide" relates to a carrier provided for supporting (and thus carrying) sample slices for imaging purposes, and also for archive purposes for storing sample slices. In an example, the sample slide comprises a glass substrate onto which the sample slice is provided. A cover, for example a thin glass or polymer layer or plate may be provided to protect and hold the sample slice.

The term "microarray block", also referred to as recipient block, relates to arrays of tissue cores that may belong to and come from different positions in the same tissue sample block and/or from different tissue sample blocks.

The term "tissue core" relates to the sample sections inside the microarray block. Tissue cores may be punched out from the tissue sample block (or donor block) at different positions and arranged in the microarray block (or recipient block) in a regular pattern. Tissue cores may have a diameter of 0.6 to 2 mm, or any other suitable value. Hence, a microarray block may comprise hundreds of tissue cores in form of spots on a single slide. For example, the tissue core is also referred to as tissue core, in case the sample sections being tissue sections.

The term "microarray slice" relates to a thin slice of the microarray block, which is obtained by sectioning the microarray block into thin slices.

The term "microarray image" relates to the image data created from the microarray slice using a digital image acquisition or scanning device. The microarray image may comprise and/or be linked to a separate file containing annotations to keep track of various images and samples of origin within each image.

According to an aspect of the present invention, the images of the tissue cores of tissue microarrays are registered with the original whole slide image of the tissue at the corresponding positions. The registration of images of the tissue cores with the original whole slide image may facilitate understanding the context of the tissue cores in the total tissue, e.g. a total tumor. Registration may involve in-plane displacement, rotation and stretching of the images in order to obtain a minimum number of matching features between the image and the reference image. The number of matching features can be between 50 and 500 or another desired number.

The display of the registered images allows the user to toggle between the view of the reference image and that of the corresponding tissue core that provides the result of a different staining procedure. Multiple staining images can be available from the same core all registered to each other so that the user can toggle between the different images. Alternatively, a semi-transparent image can be overlaid on a reference image to assist the interpretation of the observations. Optionally, a digital staining may be carried out in the areas outside the images of the tissue cores such that the staining pattern of the tissue cores is extended into the periphery area of the registered reference image. The digital staining intensity may be faded (i.e. increased transparency) with increasing uncertainty and/or distance from the tissue core to which it is related. The extension of staining pattern may facilitate manual scoring and interpretation. As a further option, multiple cores at different positions and/or multiple stains may be registered together with the original whole slide image e.g. for understanding heterogeneous aspect of tumors, for sub-typing tumors for oncology diagnostics, or for any other analyzing purposes.

The reference image can be preferably a hematoxylin and eosin stain (H&E) stained tissue section of the patient sample. This section is preferably acquired before the manufacture of the micro-array. The positions of the cores to be extracted from the donor tissue block can be determined on the reference image. The coordinates of the core positions can be stored in a file and used as a starting position for the registration of the images from the respective cores to the reference image. The sections containing the array of cores are subjected to different, preferably biomarker directed staining assays, for instance for subtyping a tumor and obtaining information that supports the diagnosing a patient case.

The images of cores corresponding to the same tissue block of origin can be combined in a single image and registered to the reference image. This can be images from different stains. The virtual staining outside the area of the core can be a combined staining from different images to represent a combination of information. As an example one can combine a cell membrane staining for instance for human epidermal growth factor receptor 2 (HER2) with a nuclear staining, for instance for estrogen receptors (ER) and optionally combine that with a Fluorescence in Situ Hybridization (FISH) staining for Her2-neu gene amplification in a breast tumor sample. In this way all information can be displayed in a single view with the possibility to highlight or dim each of the stains individually. By overlaying and extending the stain outside the core area the pathologist gets a better impression of the tumor properties. By highlighting or dimming staining images in an overlay a virtual staining is presented also in the core area in addition to the area surrounding the core. The virtual staining can use different colors than the original stains to facilitate viewing overlapping areas.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings.

The figures are only schematically illustrated and not to scale. Same reference signs refer to same or similar features throughout the figures.

DETAILED DESCRIPTION OF EMBODIMENTS

Figure 1:
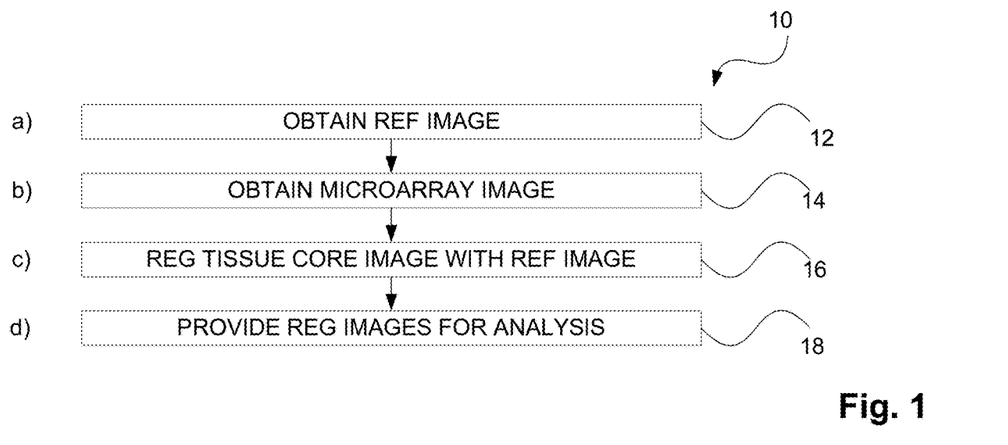
FIG. 1 shows an example of a method for tissue examination.

FIG. 1 shows basic steps of a method 10 for tissue examination. The method comprises the following steps:

In a first step 12, also referred to as step a), a reference image of a reference slice obtained from a tissue sample block is provided.

In a second step 14, also referred to as step b), a microarray image of a microarray slice comprising at least one tissue core obtained from at least the tissue sample block is provided.

In a third step 16, also referred to as step c), tissue core images of the at least one tissue core are registered with the reference image based on a spatial arrangement of the respective tissue core within the tissue sample block.

In a fourth step 18, also referred to as step d), the registered tissue core images are provided in combination with the reference image for analyzing purposes.

In step a), the reference image may be previously stored in an image management system, which allows for retrieval either locally or remotely. The reference image may also be directly provided by an image acquisition device, such as a desktop slide scanner.

Figure 2:
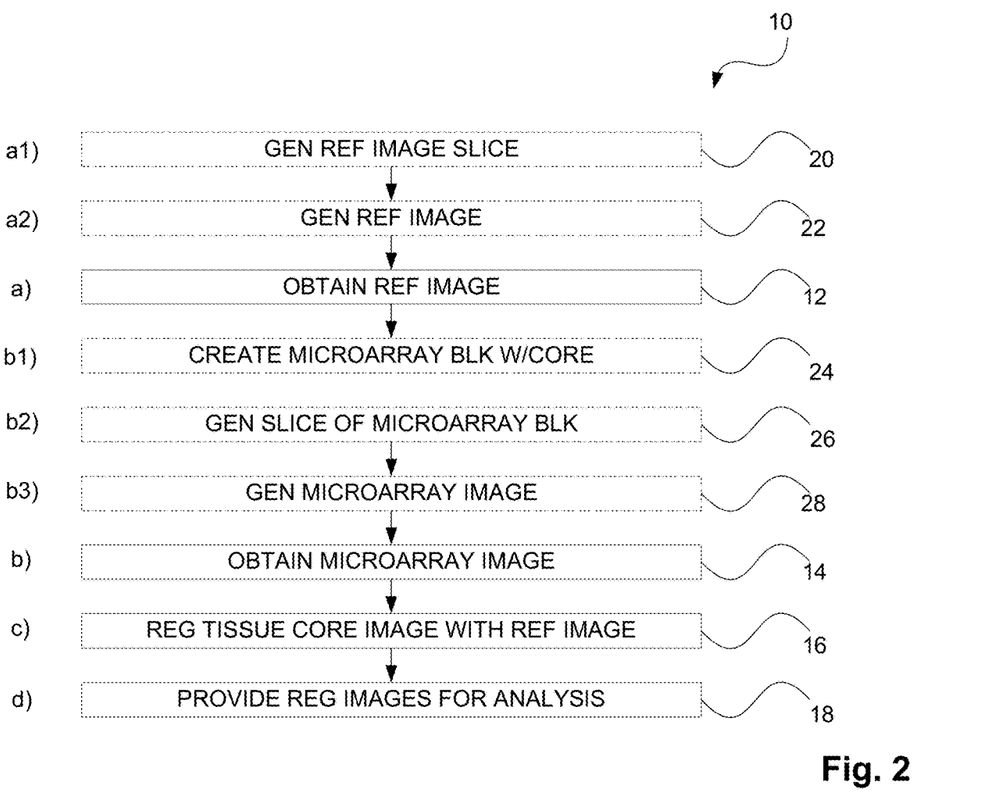
FIG. 2 shows a further example of a method for tissue examination.

FIG. 2 shows an option, according to which, for step a) it is provided: a1) generating 20 the reference image slice from the tissue sample block; and a2) generating 22 an image from the reference slice as the reference image. The optional steps a1) and a2) are indicated in FIG. 2 by a dotted line.

In step a1), the reference slice may be stained e.g. with H&E stain, before generating an image to enhance contrast and make morphological features visible.

In step b), the microarray image may also be previously stored in an image management system. Alternatively, the microarray image may be provided by an image acquisition device.

It is noted that the alphabet symbols (letters) used for the method steps, are used to differentiate the method steps, which symbols, however, are not meant to limit the order of the method steps to the alphabet sequence. For example, the reference image may also be taken after the removal of the tissue cores. In other words, tissue examination may also be carried out based on the following sequential steps: b)-a)-c)-d).

Also illustrated in FIG. 2 is a further option, according to which, for step b), it is provided: b1) creating 24 a microarray block comprising at least one tissue core arranged within a block structure; b2) generating 26 at least one microarray slice of the microarray block; and b3) generating 28 an image of the microarray slice as the tissue microarray image. The optional steps b1) to b3) are also indicated in FIG. 2 by a dotted line.

In step b2) the at least one microarray slice may be stained. Optionally, the at least one microarray slice is stained differently than the reference slice.

In other words, the microarray slice may optionally be treated with a staining protocol, e.g. for assessing the signaling proteins or molecular biomarkers of cancer.

Figure 3A:
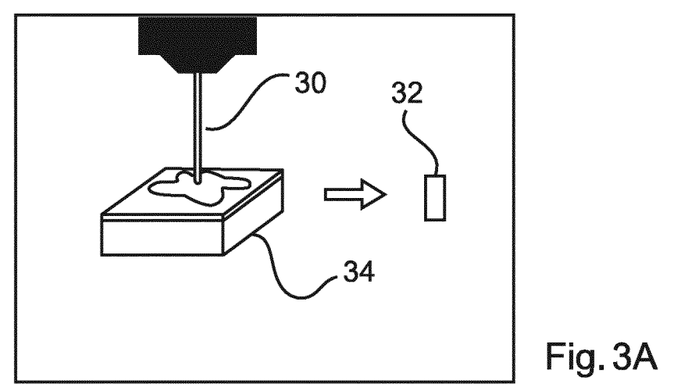
FIGS. 3A to 3C show a schematic illustration of FIG. 2.
Figure 3B:
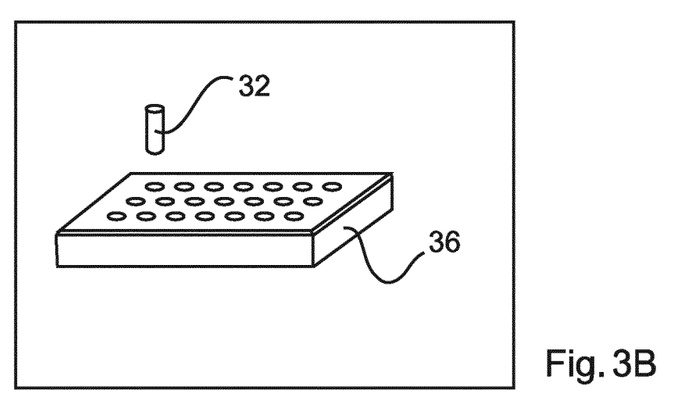
Figure 3C:
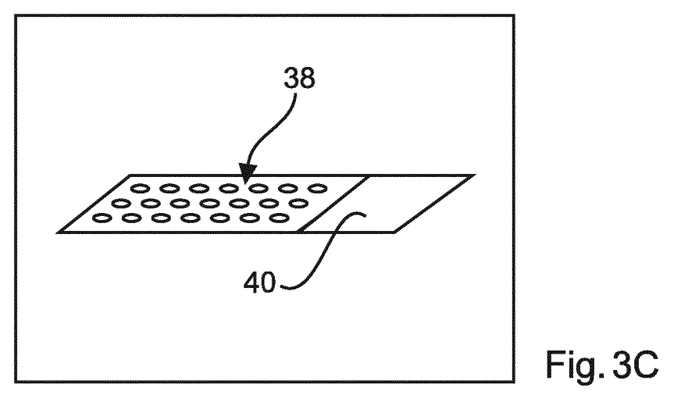

FIG. 3A to FIG. 3C show the optional steps b1) to b3).

In FIG. 3A, a donor punch 30 is used to extract at least one tissue core 32 from the tissue sample block 34 (or donor block).

Optionally, digital whole slide images of H&E stained slices obtained from the tissue sample block 34, i.e. donor block with paraffin-embedded tissue sample, may be acquired before the punching process. The positions of the tissue cores to be removed may be chosen and indicated on the respective digital whole slide image. In this way, the coordinates of different tissue cores are available. Thus, the tissue microarray 36 may be created automatically.

In FIG. 3B, the extracted tissue cores 32 are arranged or reassembled in a microarray block 36 (or recipient block).

The production of the tissue cores 32 and assembly in the microarray block 36 may require some feedback from the tissue sample block 34. For example, for verification, digital whole slide images may be taken from the tissue sample block 34 after removal of the tissue cores 32. Although not illustrated, as an option, additional tissue cores may be added from reference samples to serve as a calibration reference for various intended staining reactions.

In FIG. 3C, at least one tissue microarray slice 38 is created by cutting or sectioning the microarray block 36 into e.g. 4- to 5-micron thick sections. The tissue microarray slice 38 is supported by a transparent slide 40. The microarray slice 38 may be scanned to obtain a whole slide image of the microarray slice 38, or stored for later use.

Optionally, the microarray slice 38 may be stained with biomarkers according to the investigations at hand. This may be immune-, or in-situ hybridization (ISH) staining or any other special stain, or combinations thereof, in bright-field mode or in fluorescence. After the staining procedures, the microarray slice 38 is scanned to obtain a whole slide image of the stained microarray slice 38.

Figure 4:
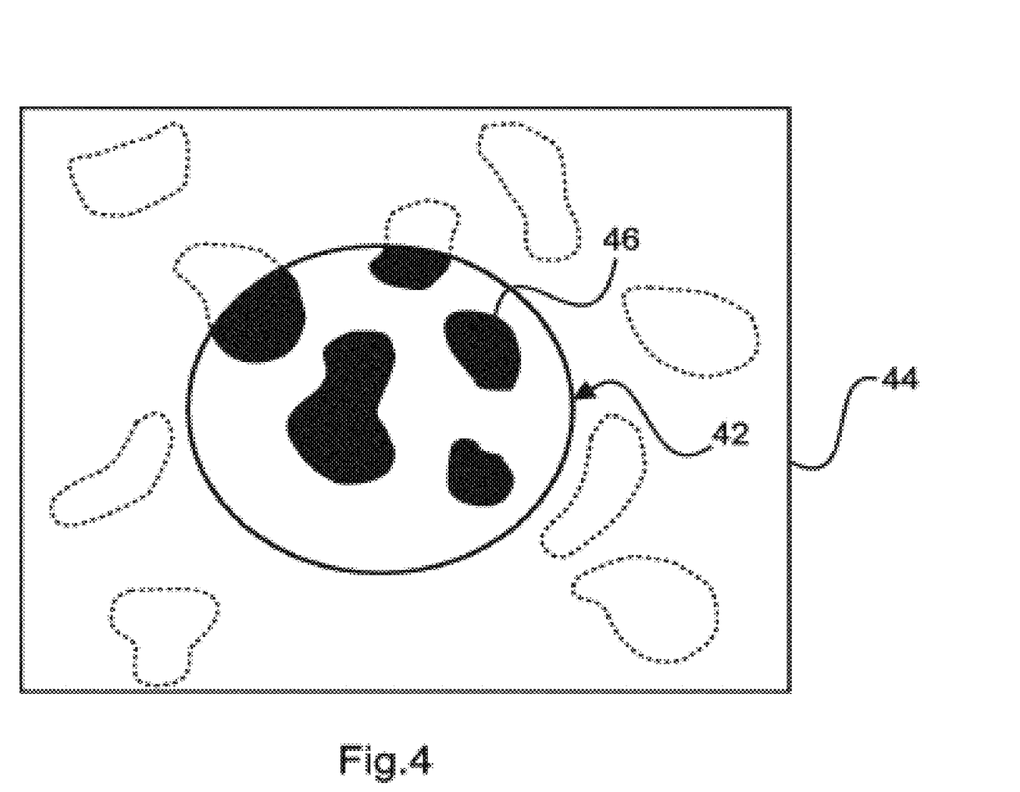
FIG. 4 shows an example for registering a tissue core image with a reference image.

FIG. 4 shows an example of step c) for registering a tissue core image 42 with a reference image 44.

The tissue core image 42 relates to the image area that corresponds to the tissue core 32 (see FIG. 3C) in the whole slide image of the microarray slice 38 (see FIG. 3C). The reference image 44 may be acquired before or after removal of the tissue cores. In case the reference image 44 is taken after core removal, a careful extraction and assembly process may be needed, since only coordinates from the tissue cores can be used.

Also illustrated as an option in FIG. 4, the tissue core 32 is treated with a staining protocol for staining or colorizing features of interest 46 inside the tissue core 32. In this example, the features of interest 46 relates to the cytoplasm of tumor cells.

The tissue core image 42 is registered with the reference image 44 based on the spatial arrangement of the respective tissue core within the tissue sample block. The spatial arrangement may be determined based on feature matching, on basis of coordinates, or a combination thereof.

The term "to register" relates to arranging or positioning the tissue core image(s) on the corresponding positions on the reference image. The registration may be intensity-based or feature-based.

Intensity-based methods compare intensity patterns in images via correlation metrics.

Feature-based methods find correspondence between image features such as points, lines, contour or other features that are known in image analysis, which may be determined by intensity variations. Hence, the intensity-based methods may also be considered as feature-based methods. The registration may be done by detecting matching features between the tissue core image(s) and portion(s) (or sub-image) of the reference image. The tissue core image(s) may be rotated, translated, or stretched to match the corresponding portion(s) of the reference image. For example, for the image registration, at least some features (e.g. A, B, C) in the tissue core image(s) are projected onto similar features (e.g. A', B', C') in the corresponding portion (s) of the reference image.

The term "feature of interest" relates to points, lines, and contours or other features that are known in image analysis. The features of interest may be associated with e.g. sub-structures of certain biological material (e.g. cytoplasma of tumor cells), a region of interest (e.g. region containing tissue) or a removing area (e.g. an area in which tissues are scraped off for the purpose of e.g. molecular diagnostic tests), etc.

Figure 5:
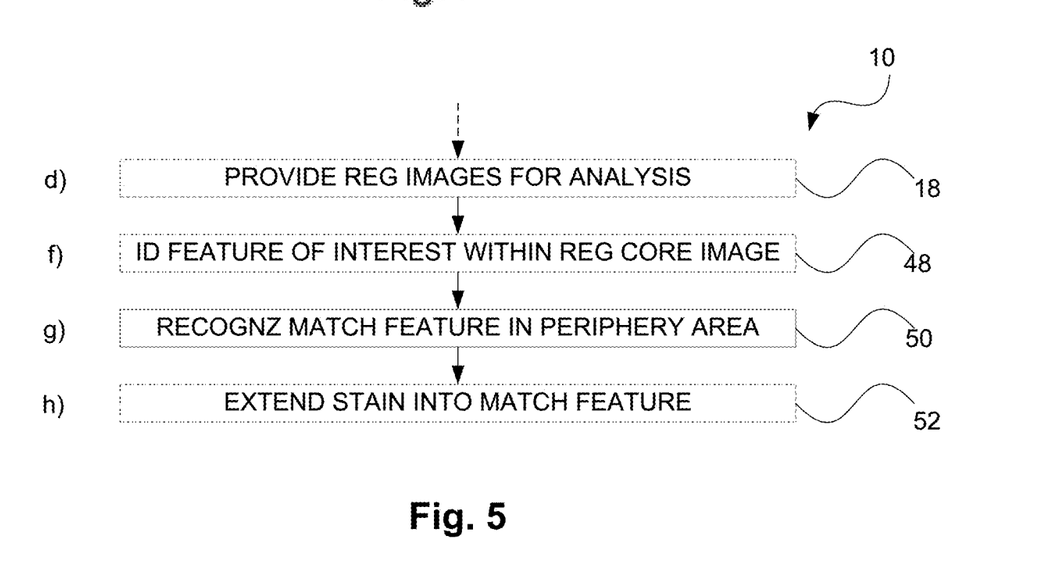
FIG. 5 shows another example of a method for tissue examination.

FIG. 5 shows a further option, according to which, the method 10 further comprises:

f) identifying 48 a feature of interest within the registered tissue core images based on morphological information of the registered tissue core image;

g) recognizing 50 a matching feature in an periphery area on the reference image based on the morphological information, wherein the periphery area surrounds the respective registered tissue core image; and h) extending 52 a staining pattern of the feature of interest within the registered tissue core images into the matching feature in the periphery area such that the staining pattern continues through and beyond a perimeter of the respective registered tissue core image.

In embodiments related to this option, the tissue microarray unit identifies which feature of interest in a core image may be extended according to step h), by determining whether the feature of interest is in contact with a border of the core image. If a contact exists, it may be an indication that a matching feature may exist in the periphery area on the reference image. The tissue microarray unit then analyzes the reference image in the periphery area at or around the contact position, to determine if a matching feature can actually be found in the reference image. The matching feature should also be in contact with the border of the core image at same position(s) than the feature of interest. The skilled person in the art will appreciate that some alternatives are possible. For instance, the tissue microarray unit may use the reference image instead of the core image, to detect the presence of contact between the border of the core image and a potential matching feature. When a contact is detected, it may be an indication that a feature of interest in the core image may correspond to the potential matching feature and thus be the subject of an extension of a staining pattern according to step h).

The extension of the staining pattern of the feature of interest within the registered tissue core images into the matching feature in the periphery area such that the staining pattern continues through and beyond a perimeter of the respective registered tissue core image may be implemented by analyzing in the core image the intensity of the pixels of the feature of interest that are in the vicinity of said border. The intensity of these pixels may serve as a basis for determining the intensity of the pixels constituting the extension of the staining pattern. The skilled person in the art will understand that there are many different possibilities for such determination, such as but not limited to calculating an average intensity of said pixels. The term "morphological information" relates to the appearance of the features inside the image, such as shape, structure, color, pattern, etc. Some morphological information may be obtained after the staining process.

The term "matching feature" relates to points, lines, and contours in the periphery area on the reference image, which have similar morphological information as the feature of interest inside the tissue core image. For example, if the feature of interest relates to sub-structures of certain biological material such as cytoplasma of tumor cells, the matching feature may also relate to the corresponding sub-structures in the periphery area. In a further example, in case the feature of interest relates to a region of interest, such as the region containing tissue, the matching feature may also relate to the region of interest.

The extension, also referred to as extrapolation of the staining pattern, relates to digitally coloring the matching feature with similar staining colors as the feature of interest. If desired, the intensity/transparency may be adapted to e.g. distance or the similarity between the matching feature and the feature of interest. The extension of the staining pattern into areas outside the tissue core area may facilitate manual scoring and interpretation.

Figure 6:
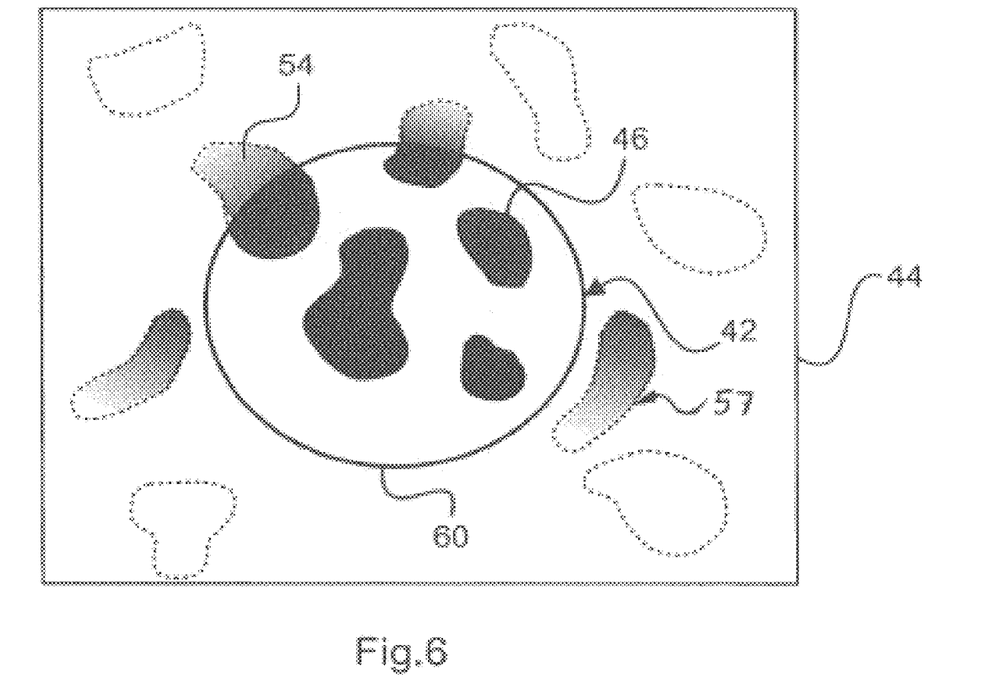
FIG. 6 shows an example of extending staining pattern of FIG. 4.

FIG. 6 shows an example of extending staining pattern of FIG. 4.

Matching features 54 are identified that correspond to the features of interest 46. In this example, the matching features 54 also relate to cytoplasm of tumor cells, but outside the tissue core image 42.

In this way, the corresponding features of interest outside the tissue core images, i.e. the matching features, can be digitally stained or marked. This may support a user, e.g. a pathologist, in identifying the features of interest not only inside the tissue core images, but also in the areas outside, which thus facilitates e.g. manual scoring and interpretation.

The periphery area may have a range. In other words, the features outside of the range are not further digitally stained or colorized. The range may be e.g. of the order of 1/100 the radius of the core to 2 times the radius or more.

Further, FIG. 6 illustrates an embodiment of the invention which has not yet been discussed, wherein the tissue microarray analyzing unit has digitally stained a feature of interest 57 in the reference image that is not in contact with the border of the core image but still within a predefined distance from said border. Indeed, the tissue microarray analyzing unit has determined that this feature 57 has an architecture which is similar to a feature of interest present in the core image (not shown in FIG. 6). By way of a non-limitative example, the feature of interest may be a gland having an architecture with a well recognizable characteristic by the analyzing unit. Depending on the type of feature of interest, one particular characteristic parameter may be used by the analyzing unit, such as but not limited to a cell density, nuclear size, stain intensity, nucleus cyto-plasm ratio, cell shape, etc.

Figure 7:
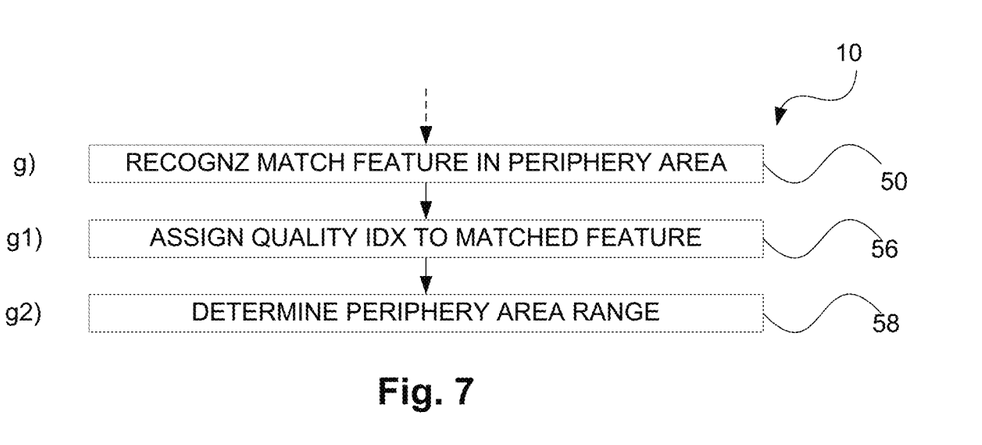
FIG. 7 shows a further example of a method for tissue examination.

FIG. 7 shows a further option, according to which, step g) further comprises: g1) assigning 56 a quality index to the matching feature in the periphery area; and g2) determining 58 a range of the periphery area based on the assigned quality index.

In an example, the quality index is assigned based on the similarity of the morphological information between the feature of interest and the matching feature.

In a further example, other measures, such as the similarity of the tissue as a whole, may be used for determining the quality index.

Referring now to FIG. 6, as a further option, the staining pattern that extends into the matching features 54 has a transparency and/or intensity in dependence of: the assigned quality index and/or a distance from the registered tissue core image.

For example, as shown in FIG. 6, the transparency and/or intensity of the matching features 54 may vary according to the distance to the registered tissue core image. In other words, the matching features 54 close to a boundary 60 of the tissue core image 42 may receive the same staining intensity as the features of interest 46 inside the tissue core image 42, whereas the matching features 54 away from the tissue core images may be gradually decreased.

In a further example, not further shown, the intensity of the staining as projected or extended may be decreased with reduced assigned quality index assigned to the matching feature. For example, nucleus of tumor cells may be assigned with a high quality index and thus high intensity, whereas cytoplasma of tumor cells may be assigned with a low quality index and thus low intensity. In a further example, the quality index is related to the staining protocol applied on the sample slide. Thus, quality indices can be used to estimate the boundary or range for each biomarker separately.

In this way, a user may identify the reliability of the feature extension (or feature matching) according to the respective intensity and/or transparency of matching features.

Figure 8:
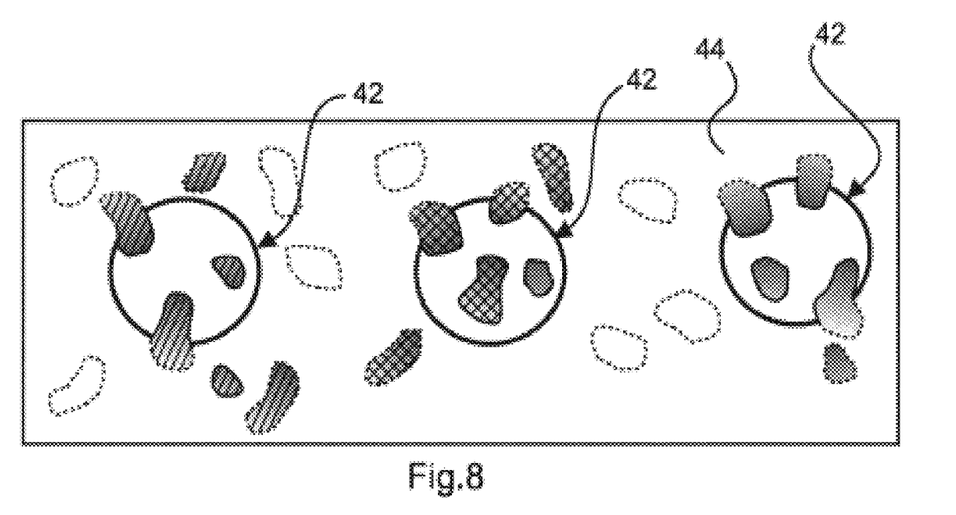
FIG. 8 shows a still further example of a method for tissue examination.

FIG. 8 shows a further option, according to which, at least two tissue cores 38 (see examples in FIG. 3C) are stained with different staining protocols (indicated with different patterns), and in step c), tissue core images 42 of the at least two tissue cores 38 are registered with the reference image 44.

Optionally, the tissue core images 42 may have different degrees of extension.

The term "staining protocol" relates to a certain procedure applied to the tissue cores. The term "to stain" relates to coloring otherwise transparent tissue sections, thus allowing highly trained pathologists, for example, to view tissue morphology (structure) or to look for the presence or prevalence of particular cell types, structures or even microorganisms such as bacteria, proteins and nucleic acids.

Various staining protocols will be appreciated, including for example routine stains, special stains, and advanced stains.

The term "routine stain" relates to H&E stain, or HE stain, which is one of the principal stains in pathology and is used "routinely" with all tissue specimens to reveal the underlying tissue structures and conditions.

The term "special stains" relates to a large number of alternative staining techniques that are used when the H&E stain does not provide all the information the pathologist or researcher needs. For example, periodic acid Schiff (PAS) staining is often used to stain kidney biopsies, liver biopsies, certain glycogen storage diseases in striated muscles and suspected fungal infections.

The term "advanced stains" relates to methods of staining that use affinity-based binding reagents (Immunohistochemica) or ISH (In situ hybridization) to target specific proteins or DNA/RNA sequences, respectively. For example, in case of breast cancer diagnosis, different IHC stains (e.g. against ER, PR, Ki67 and HER2 protein) may be used to determine the exact sub-type of cancer.

In this way, multiple stains may be visualized on the same reference image simultaneously at the same and/or different positions. Displaying multiple cores may be used to indicate tumor heterogeneity and create a better overview of the whole tumor. By optionally extending the staining pattern, a user may acquire staining information outside the tissue core areas and may end up at a more or less complete staining of the whole slide. These procedures may be repeated for each individual biomarker staining. As a result, the interpretation or manual scoring procedures may be facilitated.

Figure 9:
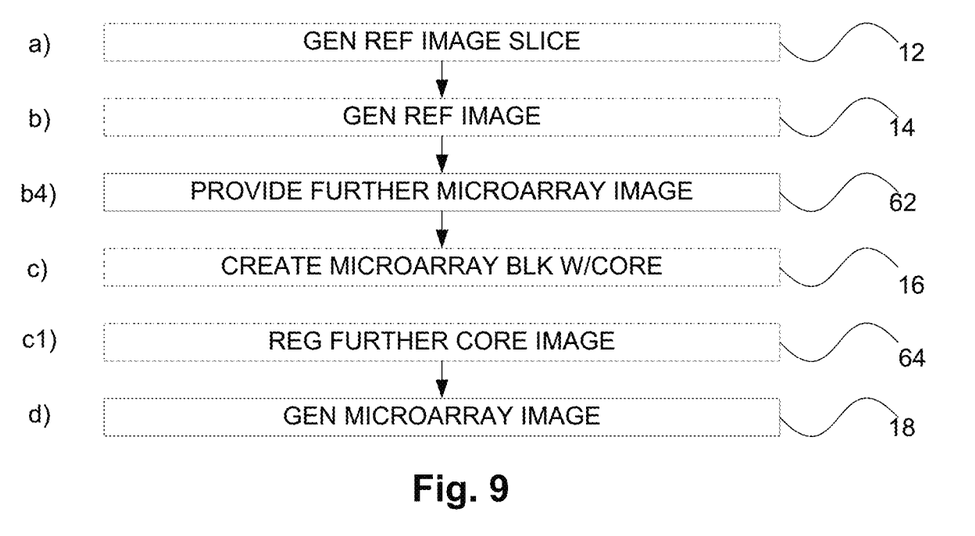
FIG. 9 shows another example of a method for tissue examination.

FIG. 9 shows a further option, according to which, the method 10 further comprises:

b4) providing 62 a further microarray image of a further microarray slice obtained from the microarray block, the further microarray slice is stained differently from the microarray slice; and c1) registering 64 further tissue core images of at least one tissue cores of the further microarray image with the reference image.

The further microarray slice may be referred to as second microarray slice, whilst the microarray slice may be referred to as first microarray slice.

In other words, multiple stains may also be visualized on different (e.g. consecutively) microarray slices at the same position (e.g. within the same tissue core).

Optionally, in step c1), the further tissue core images are registered based on at least one of the previously registered tissue core images.

This is because certain information, such as orientation of an individual tissue core with respect to the direction of the tissue microarray, is same (or almost same) for all microarray slices from the same microarray block (or recipient block). This information may thus be used for improving the registration process. For example, by assuming the same rotational orientation of all tissue core images from the same position, information gained from one tissue core image may be used to reorient further or another tissue core image from the same tissue core.

Registration of the tissue core images to the reference image may e.g. be done in the order of slicing (or sectioning), each further microarray slice may take previous microarray slice as a reference when the staining contains sufficient information. An example of the staining is H-counterstaining. In case of fluorescence staining, nuclear staining with e.g. 4',6-diamidino-2-phenylindole (DAPI) may be used.

It is thus possible to do two different staining protocols on two consecutive microarray slices and then combine the results for the same core and optionally overlay it with the reference image to extend into the surrounding. In other words, this option is to have multiple staining protocols for a number of slices from the same microarray block and to combine the images from those stains in a single image registered to the reference image. In this way, the results of the same tissue core may be displayed in a single image or a sequence of overlays that can be toggled or the like by a user.

Hence, as an additional or alternative option in FIG. 8, it is possible to have different stains on the same core by combining different staining protocols on two consecutive microarray slices (not further shown).

Of course one can do both, i.e. to have multiple staining protocols and register and display the results for all core positions from the same sample. In other words, as a further option, it is possible to combine the options as shown in FIG. 8 and FIG. 9.

It is also noted that some examples relating to the method steps may be combined. For example, as indicated above, it is possible to show multiple stains from different cores in a single representation on the reference image with digital staining. Other combinations are also contemplated in this application.

Figure 10:
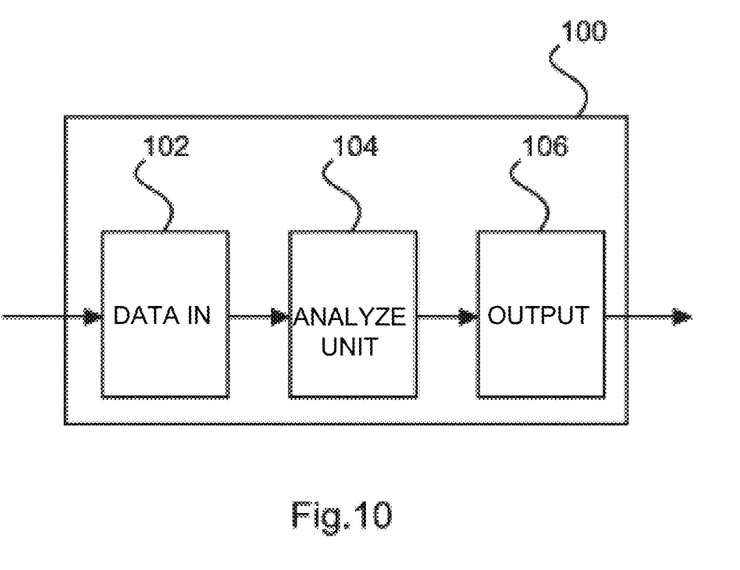
FIG. 10 shows a schematic setup of an example of an apparatus for tissue examination.

FIG. 10 shows an example of an apparatus 100 for tissue examination. The apparatus comprises a data input 102, a tissue microarray analyzing unit 104, and an output 106.

The data input 102 is configured to receive a reference image of a reference slice obtained from a tissue sample block; to receive a microarray image of a microarray slice comprising at least one tissue core obtained from at least the tissue sample block; and to provide the reference image and the microarray image to the tissue microarray analyzing unit. The data input 102 may be implemented in hardware, software, or a combination thereof.

The tissue microarray analyzing unit 104 is configured to register tissue core images of at least one tissue core with the reference image based on a spatial arrangement of the respective tissue core within the tissue sample block. Likewise, the tissue microarray analyzing unit 104 may also be implemented in hardware, software, or a combination thereof. For example, the tissue microarray analyzing unit 104 may be e.g. a processing unit.

The output 106 is configured to provide a registered result obtained from the tissue microarray analyzing unit for further analyzing purposes. The output 106 may also be implemented in hardware, software, or a combination thereof.

The data input 102 may thus be referred to as data input interface, data input unit, or data input device, depending on the types of implementations. Likewise, the output 106 may be referred to as output interface, output unit, or output device.

In an example, the data input 102, the tissue microarray analyzing unit 104, and the output 106 may be implemented in a single, unitary device.

In a further example, the data input 102, the tissue microarray analyzing unit 104, and the output 106 may be separate devices, which are assembled in the apparatus 100.

It is also noted that the at least one tissue core may be either stained e.g. with ISH dyes or unstained.

If the at least one tissue is stained, as an option, the tissue microarray analyzing unit 104 is further configured to identify a feature of interest within the registered tissue core images based on morphological information of the registered tissue core image and to recognize a matching feature in a periphery area on the reference image based on the morphological information, wherein the periphery area surrounds the registered tissue core images. The tissue microarray analyzing unit 104 is also configured to extend a staining pattern of the feature of interest within the registered tissue core images into the matching feature in the periphery area such that the staining pattern continues through and beyond a perimeter of the registered tissue core images.

Figure 11:
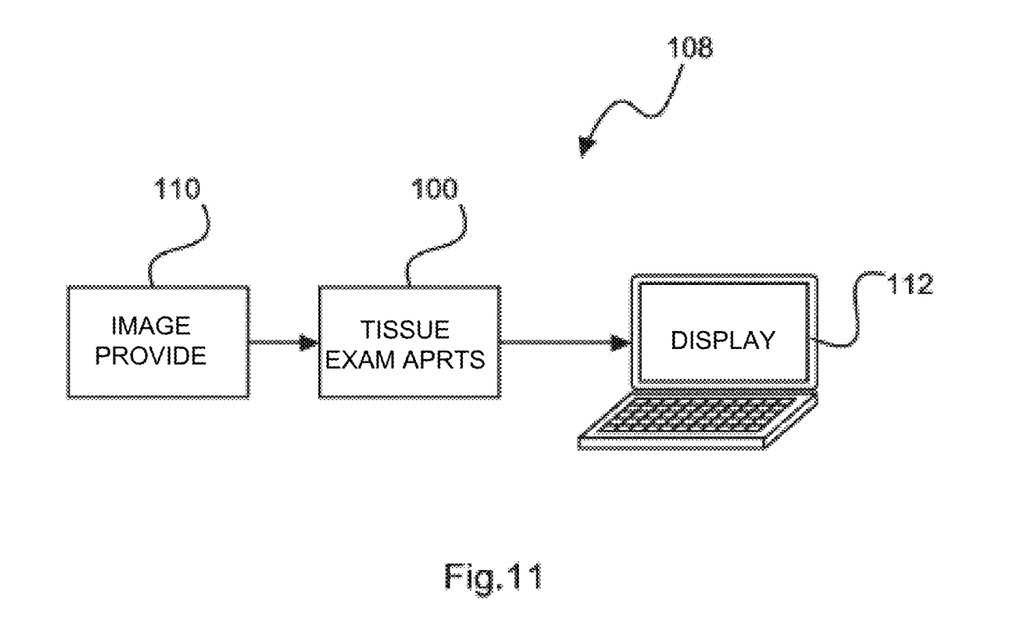
FIG. 11 shows a schematic setup of an example of a system for tissue examination.

FIG. 11 shows an example of a system 108 for tissue examination. The system comprises an image providing apparatus 110 and an apparatus for tissue examination according to one of the above-mentioned examples.

The image providing apparatus 110 is configured to provide a reference image of a reference slice obtained from a tissue sample block. In addition, the image providing apparatus 110 is configured to provide a microarray image of a microarray slice comprising at least one tissue core obtained from at least the tissue sample block. The image providing apparatus 110 is also configured to provide the reference image and the microarray image to the apparatus for tissue examination.

In an example, the image providing apparatus may comprise an image acquisition device, such as a digital pathology slide scanner or a microscope.

In a further example, the image providing apparatus may also comprise an image management system that allows for archival and intelligent retrieval either locally or remotely via the Internet.

In a still further example, the image providing apparatus may comprise an image acquisition device e.g. for acquiring the microarray image of a microarray slice, and an image management system e.g. for providing a reference image that is previously stored in the image management system.

Also shown in FIG. 11 as an option, a display 112 is provided. The display 112 is configured to display the registered tissue core images in combination with the reference image, e.g. in an overlaid manner, for analyzing purpose.

Although the display 112 is illustrated as a computer screen in FIG. 11, the display may also be an interactive user interface, e.g. a touch screen, for allowing a user to input further parameters to control the registration process.

Figure 12:
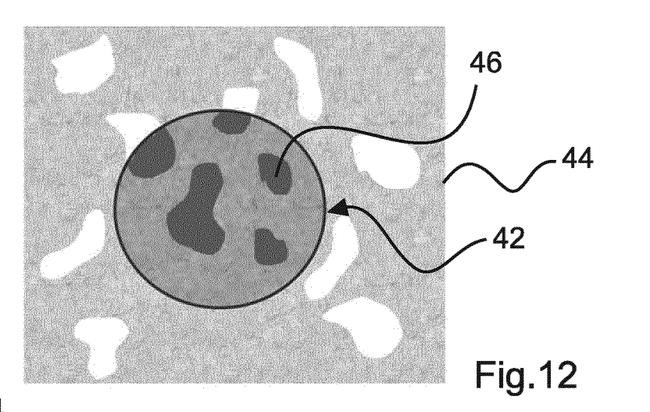
FIG. 12, FIG. 13 and FIG. 14 show photographic images of the embodiments of FIG. 4, FIG. 6 and FIG. 8 respectively.
Figure 13:
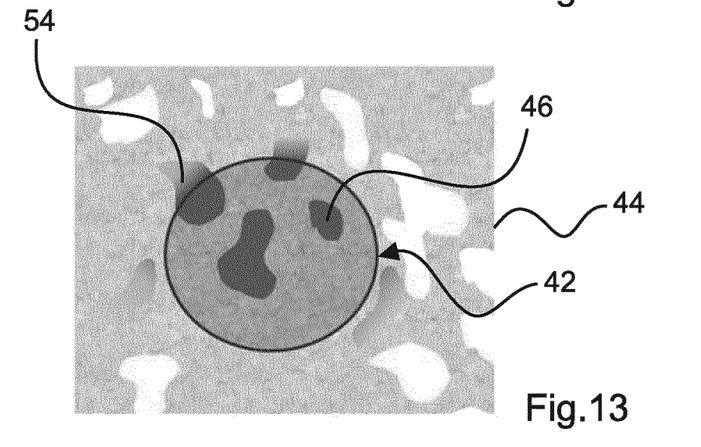
Figure 14:
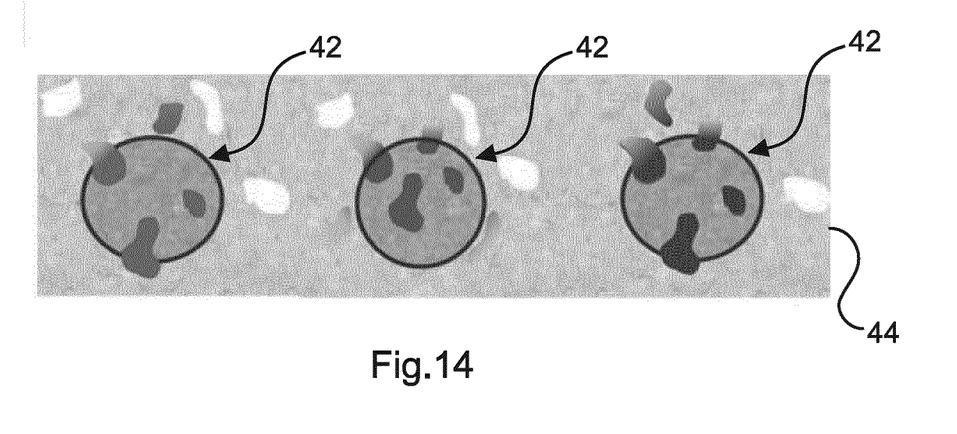

For a better understanding, FIG. 12, FIG. 13 and FIG. 14 show photographic images according to the drawings of FIG. 4, FIG. 6 and FIG. 8, respectively. Hence, the same reference numbers are indicated with respect to the FIGS. 12 to 14. In order to avoid unnecessary repetition, a description with relation to FIGS. 12 to 14 is thus not necessary.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium, such as an optical storage medium or a solid state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for tissue examination, comprising:
a data input;
a tissue microarray analyzing unit; and
an output;
wherein the data input is configured to:
receive a reference image of a reference slice, said reference slice being a sample slice obtained by sectioning a tissue sample block;
receive a microarray image of a microarray slice comprising at least one tissue core obtained from at least the tissue sample block; and
provide the reference image and the microarray image to the tissue microarray analyzing unit;
wherein the tissue microarray analyzing unit is configured to register a tissue core image or tissue core images of at least one tissue core with the reference image based on a spatial arrangement of the respective tissue core within the tissue sample block, the registration including matching at least one of a same feature or similar feature within the tissue core image or tissue core images with a feature of the reference image; and
wherein the output is configured to provide a registered result obtained from the tissue microarray analyzing unit for further analyzing purposes.

2. The apparatus of claim 1, wherein the tissue microarray analyzing unit is further configured to:
identify at least one feature of interest within the registered tissue core image or the registered tissue core images based on morphological information of the registered tissue core image or the registered tissue core images;
recognize a matching feature in a periphery area on the reference image based on the morphological information, wherein the periphery area surrounds the registered tissue core image or the registered tissue core images; and
extend a staining pattern of the feature of interest within the registered tissue core image or the registered tissue core images into the matching feature in the periphery area such that the staining pattern continues through and beyond a perimeter of the registered tissue core images.

3. A system for tissue examination, comprising:
an image providing apparatus; and
an apparatus for tissue examination according to one of the preceding claims;
wherein the image providing apparatus is configured to:
provide a reference image of a reference slice obtained from a tissue sample block;
provide a microarray image of a microarray slice comprising at least one tissue core obtained from at least the tissue sample block; and
provide the reference image and the microarray image to the apparatus for tissue examination.

4. The system of claim 3, further comprising:
a display;
wherein the display is configured to display the registered tissue core image or the registered tissue core images in combination with the reference image for analyzing purposes.

5. A method for tissue examination comprising the following steps:
a) providing a reference image of a reference slice, said reference slice being a sample slice obtained by sectioning a tissue sample block;
b) providing a microarray image of a microarray slice comprising at least one tissue core obtained from at least the tissue sample block;
c) registering one or more tissue core images of the at least one tissue core with the reference image based on a spatial arrangement of the respective tissue core within the tissue sample block, the registration including matching at least one of a same feature or similar feature within the tissue core image or tissue core images with a feature of the reference image; and
d) providing the one or more registered tissue core images in combination with the reference image for analyzing purposes.

6. The method of claim 5, wherein for step a) it is provided:
a1) generating the reference slice from the tissue sample block; and one or a combination of:
a2) generating an image from the reference slice as the reference image; or wherein for step b) it is provided:
b1) creating a microarray block comprising at least one tissue core arranged within a block structure;

b2) generating at least one microarray slice of the microarray block; and b3) generating an image of the microarray slice as the tissue microarray image.

7. The method of claim 6, wherein in step b2) the at least one microarray slice is stained; and
wherein the at least one microarray slice is stained differently than the reference slice.

8. The method of claim 5, further comprising:
f) identifying a feature of interest within the one or more registered tissue core images based on morphological information of the registered tissue core image;
g) recognizing a matching feature in an periphery area on the reference image based on the morphological information, wherein the periphery area surrounds each of the respective one or more registered tissue core images; and
h) extending a staining pattern of the feature of interest within at least one of the one or more registered tissue core images into the matching feature in the periphery area such that the staining pattern continues through and beyond a perimeter of the at least one of the respective one or more registered tissue core image.

9. The method of claim 8, wherein step g) further comprises:
g1) assigning a quality index to the matching feature in the periphery area; and
g2) determining a range of the periphery area based on the assigned quality index.

10. The method of claim 9, wherein the staining pattern that extends into the matching features has one or a combination of a transparency or intensity in dependence of:
the assigned quality index; or
a distance from the one or more registered tissue core images.

11. The method of claim 5, wherein at least two tissue cores are stained with different staining protocols; and
wherein in step c), tissue core images of the at least two tissue cores are registered with the reference image.

12. The method of claim 5, further comprising:
b4) providing a further microarray image of a further microarray slice obtained from the microarray block; wherein the further microarray slice is stained differently from the microarray slice;
c1) registering a further tissue core images of at least one of the tissue cores of the further microarray image with the reference image.

13. The method of claim 12, wherein in step c1), the further tissue core images is registered based on at least one of the previously one or more registered tissue core images.

14. A non-transitory, computer readable medium comprising instructions that, when executed by one or more processors, configures the processors to:
a) obtain a reference image of a reference slice, said reference slice being a sample slice obtained by sectioning a tissue sample block;
b) obtain a microarray image of a microarray slice comprising at least one tissue core obtained from at least the tissue sample block;
c) register one or more tissue core images of the at least one tissue core with the reference image based on a spatial arrangement of the respective tissue core within the tissue sample block, the registration including matching at least one of a same feature or similar feature within the tissue core image or tissue core images with a feature of the reference image; and
d) provide the one or more registered tissue core images in combination with the reference image for analyzing purposes.

* * * * *